Sept. 17, 1957     H. B. SHADID     2,806,247
MEAT GRINDER ATTACHMENT
Filed Feb. 17, 1956     2 Sheets-Sheet 1
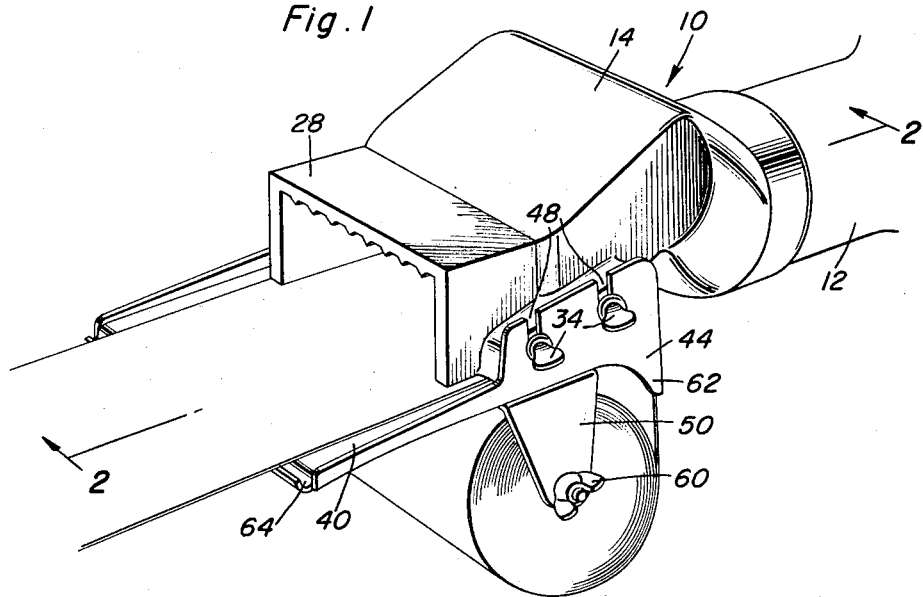
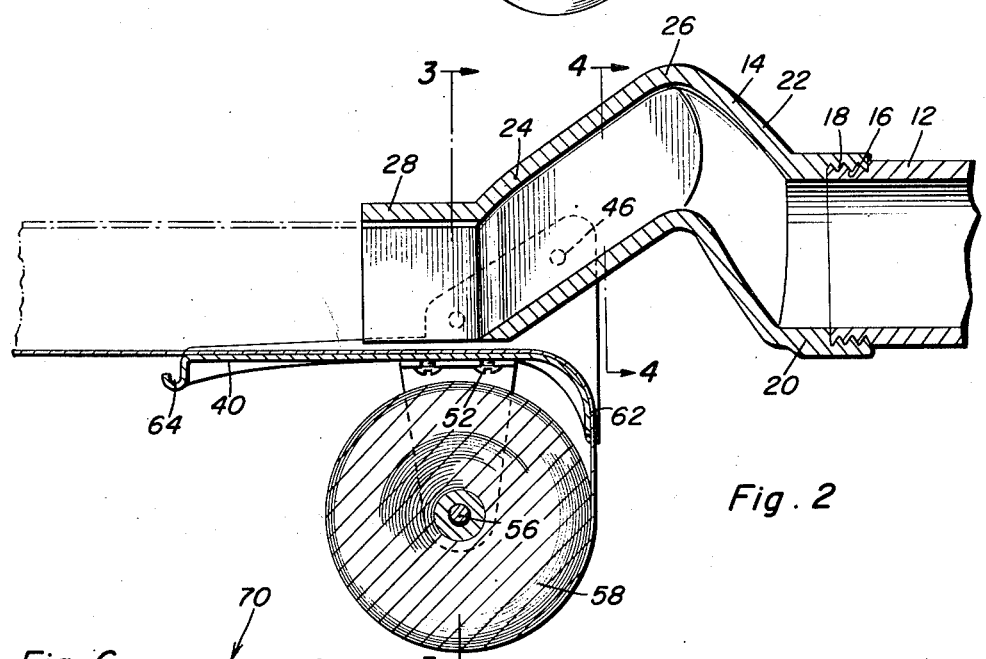
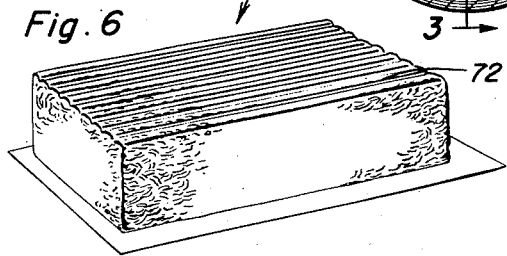
Hollum B. Shadid
INVENTOR.

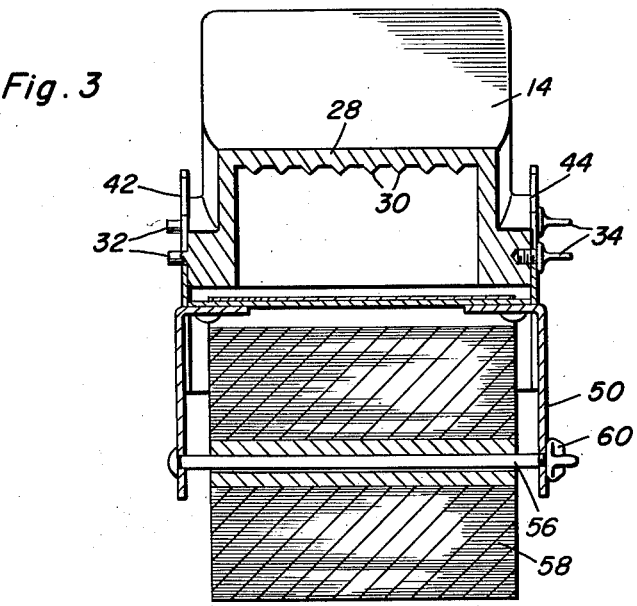
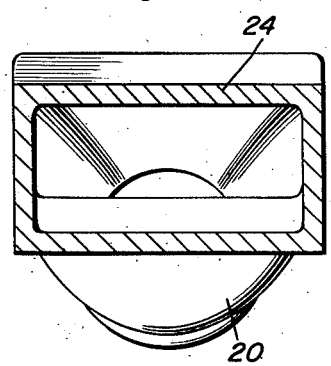
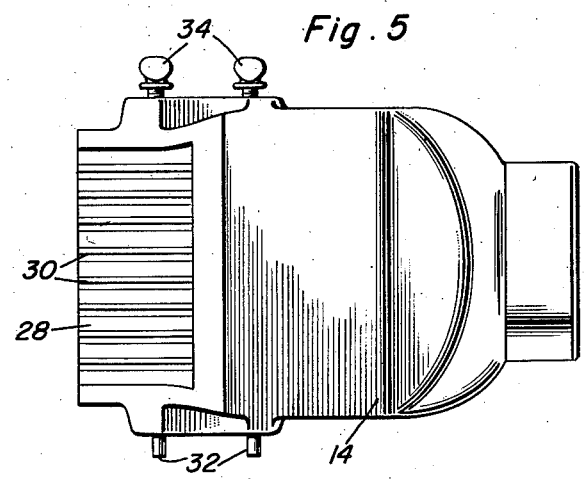
Hollum B. Shadid
INVENTOR.

United States Patent Office 2,806,247
Patented Sept. 17, 1957

2,806,247

MEAT GRINDER ATTACHMENT

Hollum B. Shadid, Oklahoma City, Okla.

Application February 17, 1956, Serial No. 566,201

4 Claims. (Cl. 17—32)

This invention relates to an apparatus for use in preparing a meat product and to a novel process for the preparation of meat patties and the like on which the attachment for the meat grinder is utilized.

The primary object of the present invention resides in the provision of an unexpectedly appetizing and tasty meat patty composed of scraps of lean beef and connective tissues such as those tissues which normally adhere to bones and muscles and which are usually disposed of by butchers with other scrap products.

A further object of the invention resides in the provision of a meat patty prepared from inexpensive cuts of meat which, when prepared in accordance with the concepts of the invention, results in a highly nourishing, tasty, desirable, and unexpectedly compact meat patty.

The barbecuing of meat patties and other similar products over grills is a popular diversion for most of the American populace. However, when broiling or otherwise cooking meat patties formed from ground meat, these patties often become loose, losing their consistency and sometimes fall into the fire over which they are being cooked thus causing unwanted waste. In addition, because of the looseness of the patties many of the highly desirable and tasty juices are lost. It is therefore one of the most important objects of the invention to provide a meat patty which when cooked remains substantially the same size and shape without much loss of weight and juices and having the particles of meat adhering to each other so as to have a consistency of a choice cut of beef, such as a steak or the like which is resistant to falling apart and unexpectedly cohesive.

A further object of the invention resides in the provision of an apparatus for use as an attachment to a meat grinder which will deliver ground meat products continuously in a strip of predetermined dimensions whereby patties of predetermined size can be easily and conveniently cut. The apparatus in accordance with the present invention in order to form patties provides novel means for packing the meat being delivered from the meat grinder and then compressing the packed meat so that it is delivered in an even and unexpectedly cohesive manner.

Still further objects and features of this invention reside in the provision of an attachment for a meat grinder which is simple in construction, highly efficient in operation, relatively inexpensive to produce, which can be made of suitable material such as cast aluminum or the like so as to conform to the various sanitary codes of the different States of the United States and which may be utilized in conjunction with various other elements of the meat grinder attachment disclosed in the copending application Serial No. 529,052 of Hollum B. Shadid, filed August 17, 1955 for Meat Grinding Attachment, now Patent No. 2,752,629.

These, together with the various ancillary objects and features of the invention which will become apparent as the following description proceeds, are attained by this meat grinder attachment, and process for preparing a meat product, a preferred embodiment of the apparatus being shown in the accompanying drawings, by way of example only, wherein:

Figure 1 is a perspective view of the meat grinder attachment comprising the present invention;

Figure 2 is a vertical sectional view as taken along the plane of line 2—2 in Figure 1 illustrating in particular the novel construction of the meat shaper which is used to pack and then compress the meat product;

Figure 3 is a vertical sectional view as taken along the plane of line 3—3 of Figure 2 illustrating in particular the ribs on the delivery outlet of the shaper;

Figure 4 is another sectional detail view as taken along the plane of line 4—4 in Figure 2 illustrating further the construction of the shaper;

Figure 5 is a bottom plan view of the shaper; and

Figure 6 is a perspective view of a meat patty produced in accordance with the concepts of the present invention.

With continuing reference to the accompanying drawings wherein like reference numerals designate similar parts throughout the various views, reference numeral 10 generally designates the meat grinder attachment comprising the present invention.

The meat grinder attachment includes an adapter 12 of any convenient shape and size adapted to be lockingly held by the conventional connector ring, not shown, of a meat grinder. The adapter 12 is utilized in connecting the shaper 14 to the meat grinder and may be externally threaded as at 16 for threaded engagement with the threaded portion 18 of the shaper 14.

The shaper 14 has a substantially cylindrical inlet section 20 and has a neck portion 22 integrally formed with and communicating with the inlet portion 20. The neck portion 22 extends angularly upwardly constrictively so as to pack meat being delivered from the meat grinder into the shaper 14. Integrally formed with the neck portion 22 is a tapering portion 24 which extends angularly downwardly and is of a further constrictive construction whereby the packed meat is compressed. This tapered portion 24 forms an apex as at 26 at its junction with the neck portion 14 and it has been found that new and unexpected results are obtained by this formation inasmuch as ground meat being delivered by the meat grinder will due to the upwardly extending neck portion be packed at the apex until sufficient meat is provided to force it through the restrictive compressing tapering portion 24. An outlet portion 28 communicates with the tapering portion 24 and is of a general rectangular shape so that the patty being delivered will be of that configuration. However, the upper inner wall of the delivery portion 28 is provided with a plurality of scoring ribs 30 which further compress the surface of the meat patty not only to cut across the fibers of the meat product in a novel manner so as to further compact them so as to provide a highly cohesive meat product but also serves to provide greater surface area for the patty during the cooking thereof.

A pair of studs 32 are affixed to the shaper 14 and a pair of wing screws 34 are threadedly engaged in threaded recesses in the shaper 14.

There is provided a platform 40 having upwardly extending flanges 42 and 44, the flange 42 being provided with apertures 46 therethrough for reception of the studs 32 while the flange 44 has slots 48 therein through which thumb screws 34 extend, the thumb screws frictionally holding the entire platform 40 in position. A substantially U-shaped member 50 is secured by means of screws 52 to the platform 40 at the underside thereof. A shaft 56 is provided for mounting a roll of paper 58. Wing nuts 60 hold the roll of paper 58 in position. The front end of the platform 40 is provided with an arcuate surface 62 over which the paper sheet of the paper roll 58 is fed. The other end of the platform 40 is provided with a trough 64 for reception of a knife blade which will enable the finished meat product to be cut to the size desired.

Shears or automatic knives as well as other means for cutting the paper and associated meat product may be utilized and the meat product can be then stacked as desired due to the cohesive nature of the meat patties.

In order to form lean pieces of beef and connective tissues such as the tissue between the various bones and the tissue which generally connects the muscles to each other and to the bone to a very tender and sumptuous meat product, it is necessary to grind the lean meat and the connective tissues, together with a suitable mixture. This mixture is in the proportion of one ounce of the mix to five pounds of beef, and the mixture itself consists of the following:

| | Parts by weight |
|---|---|
| Salt, 3 lbs | 96 |
| Sugar, 2 lbs | 64 |
| Mono sodium glutamate, c/4 oz | 1.5 |

The ground meat product is thoroughly kneaded to mix the mixture with the meat product after which the ground meat product is chilled for a period of two hours, which time is necessary to cause the connective tissue to turn gelatinous. It is noted that without this above mixture present, it will require upwards of eight hours for the connective tissue to turn gelatinous. The product is chilled in a conventional box as is customarily used by butchers which are conventionally maintained at temperatures ranging from 32° to 40°. It is not necessary or desirable to freeze the meat and therefore the temperature should be above 32°. Temperatures above 40° may allow spoilage and therefore it is most desirable to place the meat product in the chilled box.

Then the meat is again ground and forced through the shaper 14 where it is stacked at the apex 26 and then compressed. The pressure ribs 30 score and shape the meat product to form a corrugated surface on the meat product thus not only furthering the compressing of the meat product so as to provide a most cohesive patty but providing an increased surface area which will ensure increased evaporation and loss of water by the meat product further enhancing the bonding of the particles of the meat product and preventing loss of juices from cooking.

In the mixture, the sodium chloride or salt is used for its ability to prevent hydration under cold temperature storage when in the chilled box while also helping dissolve the connective tissues of the meat. It is noted, also, that during the grinding operation and before the salt has passed into solution with the fluids of the meat, the crystals of the salt are forced into the meat, thus causing better grinding and more efficient operation of the salt to cause the connective tissues to turn gelatinous.

The sugar or sucrose is used to gel the dissolved tissues and to coagulate and form the natural gelatins of the meat and seal them into the meat while also holding the natural "bloom" of the meat, thereby being an adjunct to flavor. Further, the sugar in its crystalline state further helps to grind the meat.

The mono sodium glutamate is used to enhance the natural flavor of the meat and to bring out and accentuate this flavor.

It is noted that the meat patty generally designated by reference numeral 70 in Figure 6 is of a comparatively thick size and is provided with scorings as at 72. This thick size patty must be packed by the peculiar construction at the apex 26 in order to achieve the cohesive nature thereof so desirable when broiling on a grill or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An apparatus for preparing a meat patty for use with a meat grinder comprising a shaper for receiving a ground meat product delivered from a grinder, said shaper including an inlet portion of substantially cylindrical shape, an angularly upwardly extending restrictive neck portion communicating with said inlet and with a downwardly extending tapering portion for packing ground meat at the apex formed by said neck portion and said tapering portion and for compressing the packed ground meat during travel through said tapering portion, and an outlet portion communicating with said tapering portion.

2. An apparatus for preparing a meat patty for use with a meat grinder comprising a shaper for receiving a ground meat product delivered from a grinder, said shaper including an inlet portion of substantially cylindrical shape, an angularly upwardly extending restrictive neck portion communicating with said inlet and with a downwardly extending tapering portion for packing ground meat at the apex formed by said neck portion and said tapering portion and for compressing the packed ground meat during travel through said tapering portion, and an outlet portion communicating with said tapering portion, said outlet portion having a series of compression ribs thereon.

3. An apparatus for preparing a meat patty for use with a meat grinder comprising a shaper for receiving a ground meat product delivered from a grinder, said shaper including an inlet portion of substantially cylindrical shape, an angularly upwardly extending restrictive neck portion communicating with said inlet and with a downwardly extending tapering portion for packing ground meat at the apex formed by said neck portion and said tapering portion and for compressing the packed ground meat during travel through said tapering portion, and an outlet portion communicating with said tapering portion, a paper guide detachably carried by said shaper underlying said outlet portion, and a paper roll suspended from said guide.

4. An apparatus for preparing a meat patty for use with a meat grinder comprising a shaper for receiving a ground meat product delivered from a grinder, said shaper including an inlet portion of substantially cylindrical shape, an angularly upwardly extending restrictive neck portion communicating with said inlet and with a downwardly extending tapering portion for packing ground meat at the apex formed by said neck portion and said tapering portion and for compressing the packed ground meat during travel through said tapering portion, an outlet portion communicating with said tapering portion, said outlet portion having a series of compression ribs thereon, a paper guide detachably carried by said shaper underlying said outlet portion and a paper roll suspended from said guide.

References Cited in the file of this patent
UNITED STATES PATENTS

| 2,203,318 | Yerk | June 4, 1940 |
| 2,209,824 | Louisot et al. | July 30, 1940 |
| 2,224,397 | Komarik | Dec. 10, 1940 |
| 2,752,629 | Shadid | July 3, 1956 |